United States Patent
Boss et al.

(10) Patent No.: US 10,805,414 B2
(45) Date of Patent: Oct. 13, 2020

(54) DYNAMIC RESOURCE BROKER SERVICES

(71) Applicant: INTERNATIONAL BUSINESS MACHINES CORPORATION, Armonk, NY (US)

(72) Inventors: Gregory J. Boss, Saginaw, MI (US); Christopher J. Dawson, Arlington, VA (US); Rick A. Hamilton, II, Charlottesville, VA (US); Brian M. O'Connell, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 899 days.

(21) Appl. No.: 15/212,011

(22) Filed: Jul. 15, 2016

(65) Prior Publication Data
US 2018/0020073 A1    Jan. 18, 2018

(51) Int. Cl.
*H04L 29/08*    (2006.01)
*H04L 12/911*    (2013.01)
*H04L 12/24*    (2006.01)

(52) U.S. Cl.
CPC ...... *H04L 67/2809* (2013.01); *H04L 41/0896* (2013.01); *H04L 41/5035* (2013.01); *H04L 47/783* (2013.01); *H04L 41/5096* (2013.01)

(58) Field of Classification Search
CPC .......................... H04L 67/2809; H04L 47/70
See application file for complete search history.

(56) References Cited

U.S. PATENT DOCUMENTS

| | | | | |
|---|---|---|---|---|
| 2010/0281166 A1* | 11/2010 | Buyya | ............... | G06F 9/5072 709/226 |
| 2012/0011190 A1* | 1/2012 | Driesen | ............... | G06Q 10/06 709/202 |
| 2012/0096149 A1* | 4/2012 | Sunkara | ............... | G06F 9/5072 709/224 |
| 2012/0179824 A1* | 7/2012 | Jackson | ............... | G06F 9/5027 709/226 |

(Continued)

OTHER PUBLICATIONS

Peter Mell et al., "The NIST Definition of Cloud Computing", National Institute of Standards and Technology, U.S. Department of Commerce, NIST Special Publication 800-145, Sep. 2011, 7 pages.

*Primary Examiner* — Tonia L Dollinger
*Assistant Examiner* — Joseph M Cousins
(74) *Attorney, Agent, or Firm* — Heslin Rothenberg Farley & Mesiti P.C.; Maeve Carpenter, Esq.

(57) ABSTRACT

One or more programs in a computing environment of a first service provider obtain an indication from a portion of an infrastructure of a second service provider, where the portion of the infrastructure has available computing capacity, and where the portion of an infrastructure includes at least one component. The one or more programs determine if the first service provider can deploy the portion as a portion of services deployed from the first service provider and based on making the determination that the first service provider can deploy the portion of the infrastructure, the one or more programs register the portion of the infrastructure to make it available for deployment by the first service provider. The one or more programs provision the at least one component for deployment by the first service provider in a service that includes the at least one component.

18 Claims, 7 Drawing Sheets

800

810
One or more programs obtain a notification from an infrastructure where a portion of the infrastructure is registered, that the infrastructure intends to withdraw itself from availability for allocation as resources of the shared computing environment 820
The one or more programs determine that the infrastructure meets pre-defined conditions for withdrawal from registration 830
Based on determining that the pre-defined conditions are met, the one or more programs terminate the registration of the infrastructure (56) References Cited

U.S. PATENT DOCUMENTS

| | | | |
|---|---|---|---|
| 2013/0262180 A1 | 10/2013 | Back | |
| 2014/0006626 A1* | 1/2014 | Breiter | H04L 41/0806 709/226 |
| 2014/0075032 A1* | 3/2014 | Vasudevan | H04L 41/50 709/226 |
| 2014/0280701 A1* | 9/2014 | Wolcott | H04L 69/324 709/217 |
| 2015/0134485 A1* | 5/2015 | Kim | H04L 41/5009 705/26.41 |
| 2015/0304234 A1* | 10/2015 | Salle | G06F 7/00 709/226 |
| 2015/0363281 A1 | 12/2015 | Alderman et al. | |
| 2016/0080477 A1* | 3/2016 | Nedeltchev | H04L 65/1059 709/226 |
| 2016/0350173 A1* | 12/2016 | Ahad | G06F 11/3495 |
| 2017/0279692 A1* | 9/2017 | Llagostera | G06F 16/9024 |
| 2017/0339070 A1* | 11/2017 | Chang | H04L 47/829 |
| 2018/0152392 A1* | 5/2018 | Reed | G06Q 10/06 |

* cited by examiner

One or more programs determine that a portion of an infrastructure of a computing resource is available for allocation in a shared computing environment.

510a

One or more programs receive a query from an infrastructure requesting whether the shared computing environment is accepting registration of new infrastructures.

510b

One or more programs respond to the infrastructure and provided that the one or more programs are accepting registration, the one or more programs will request that the infrastructure provide self-identifying information to the cloud broker.

510c

One or more programs determine whether the self-identifying information comprises attributes that meet the pre-defined parameters.

520

One or more programs register the portion of the infrastructure as available for allocation.

One or more programs query a resource of the infrastructure to determine in the component is still available.

620

In response to the query, the one or more programs obtain a response from the resource indicating any changes to the component since the registration.

630

Based on the changes, the one or more programs determine if the component meets the pre-defined parameters.

DYNAMIC RESOURCE BROKER SERVICES

TECHNICAL FIELD

One or more aspects of the present invention relate to dynamic distribution of computer resources.

BACKGROUND

Cloud computing systems enable users to access software and information without exposing the specifics of the computer architecture that serves these resources. Users can access resources provided through the virtual and real resources in a cloud over the Internet and benefit from utilizing this virtual, Service-oriented architecture, and utility computing. Details are abstracted from consumers, who no longer have need for expertise in, or control over, the technology infrastructure "in the cloud" that supports them.

Cloud computing can be utilized as a delivery model for information technology (IT) services over the Internet. For example, IT service can be provided in a cloud computing model by provisioning dynamically scalable and often virtualized resources that a consumer can access over the Internet. In order to meet IT service needs, cloud services today may be rendered through dynamic infrastructure provisioning: within a relatively static hardware pool, operating systems and applications are deployed and reconfigured to meet dynamic customer computational demands. When resources are allocated to a requestor, within the cloud's boundaries, images are installed and overwritten, IP addresses are modified, and real and virtual processors are allocated to meet the needs of the requestor. However, the underlying static nature of the hardware pool from which computing resources are apportioned utilizing the cloud computing service provider model remains a limitation in this model.

SUMMARY

Shortcomings of the prior art are overcome and additional advantages are provided through the provision of a method of infrastructure sharing among service providers. The method includes, for instance: obtaining, by one or more processor in a computing environment of a first service provider, an indication from a portion of an infrastructure of a second service provider, wherein the portion of the infrastructure has available computing capacity, and wherein the portion of an infrastructure comprises at least one component; determining, by the one or more processor, if the first service provider can deploy the portion of the infrastructure as a portion of services deployed from the first service provider; based on determining that the first service provider can deploy the portion of the infrastructure, registering, by the one or more processor, the portion of the infrastructure, wherein the registering renders the portion of the infrastructure available for deployment by the first service provider; and provisioning, by the one or more processor, the at least one component for deployment by the first service provider in a service comprising the at least one component.

Shortcomings of the prior art are overcome and additional advantages are provided through the provision of a computer program product for infrastructure sharing among service providers. The computer program product includes, for instance a computer readable storage medium readable by one or more processor and storing instructions for execution by the one or more processor for performing a method that includes: obtaining, by one or more processor in a computing environment of a first service provider, an indication from a portion of an infrastructure of a second service provider, wherein the portion of the infrastructure has available computing capacity, and wherein the portion of an infrastructure comprises at least one component; determining, by the one or more processor, if the first service provider can deploy the portion of the infrastructure as a portion of services deployed from the first service provider; based on determining that the first service provider can deploy the portion of the infrastructure, registering, by the one or more processor, the portion of the infrastructure, wherein the registering renders the portion of the infrastructure available for deployment by the first service provider; and provisioning, by the one or more processor, the at least one component for deployment by the first service provider in a service comprising the at least one component.

Computer systems and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

In an embodiment of the present invention, one or more programs 440 (see, e.g., FIG. 1) in a computing environment of a first service provider, obtain an indication from a portion of an infrastructure of a second service provider, where the portion of the infrastructure has available computing capacity, and where the portion of an infrastructure includes at least one component. The one or more programs 440 determine if the first service provider can deploy the portion of the infrastructure as a portion of services deployed from the first service provider and based on making the determination that the first service provider can deploy the portion of the infrastructure, the one or more programs 440 register the portion of the infrastructure. By registering the portion, the one or more programs 440 make it available for deployment by the first service provider. The one or more programs 440 provision the at least one component for deployment by the first service provider in a service that includes the at least one component. At least one of the first service provider or the second service provider may be a cloud service provider.

In an aspect of an embodiment of the present invention, as part of determining if the first service provider can deploy the portion of the infrastructure, the one or more programs 440 request, responsive to obtaining the indication, attributes of the infrastructure. In response to this request, the one or more programs 440 obtain the attributes of the infrastructure. The one or more programs 440 determine, based on the attributes and pre-defined parameters of the first service provider, if the first service provider can deploy the portion of the infrastructure as a portion of a service deployed from the first service provider. The attributes may include, but are not limited to, resource type, security compliance information, processing capabilities, service type, cost, and method of interaction.

In another aspect of an embodiment of the present invention, as part of determining if the first service provider can deploy the portion of the infrastructure, the one or more programs 440 determine that the portion of the infrastructure is available for deployment for a given period of time.

In another aspect of an embodiment of the present invention, as part of provisioning the at least one component for deployment, the one or more programs 440 obtain a request from a user for the service, where the service includes at least two components. The one or more programs 440 select the at least two components from a group of registered components, where at least one component selected includes the at least one component of the second provider. The one or more program 440 generates the service from the selected components by configuring the at least two components and configuring connections between the at least two components. In an embodiment of the present invention, the one or more program 440 selects a second component of the at least two components where a physical location of the second component is in close proximity to a physical location of the at least one component of the second provider. In an embodiment of the present invention, to generate the service, the one or more programs 440 may perform one or more of the following: use registered Application Programming Interfaces to create instances of the at least two components, install the at least two components, configure connections between the at least two components, and/or configure networks paths the at least two components.

In another aspect of an embodiment of the present invention, the one or more programs 440 deploy the service by providing, in an interface of a computing resource accessible to the user, a service entry point and a service exit point for utilizing the service. In another aspect of an embodiment of the present invention, the one or more programs 440 monitor utilization of the deployed service by the user and when the one or more programs 440 obtain an indication from the user that the service is not meeting pre-defined parameters, select a component from a group of registered components, and replace one of the at least two components with the component.

In still another aspect of an embodiment of the present invention, the one or more programs 440 unregister the portion of the infrastructure. In an embodiment of the present invention unregistering the portion includes the one or more programs 440 obtaining an indication from the infrastructure that the portion of the infrastructure is not available for provisioning and deployment by the first service provider infrastructure, determining, based on pre-defined conditions that the portion that the infrastructure can be unregistered, and based on this determination, unregistering the portion of the infrastructure. The pre-defined conditions may vary across embodiments of the present invention and may include, but are not limited to: whether the service completed certain jobs, whether the portion of the infrastructure has met a Service Level Agreement, and/or whether payment has been made by the first service provider for utilization of the portion of the infrastructure.

An advantage of certain embodiments of the present invention in that it provides a sharing economy approach for infrastructure owners to make their components available to a cloud provider. Additionally, aspects of certain embodiments of the present invention improve present computing technology by improving resource allocation by shared computing systems, including clouds. By utilizing aspects of the present invention, the resource capacity of a computing system is not limited by the physical constraints of the system. Embodiments of the present invention enable the capacity of a shared environment to be expanded, as needed, without permanently changing the system itself, but instead, leveraging available resources of other systems. Additionally, these other systems benefit by effectively sharing their underutilized resources and therefore, resources do not remain idle, wasting potential processing capabilities. Additional aspects of certain embodiments of the present invention also enable a user of a shared computing environment to utilize an optimized service from that computing environment, as the service provider can act as a broker and generate a composite solution for the user that is not constrained by the resources available in a single system. Thus, embodiments of the present invention include aspects that constitute improvements to resource allocation in shared computing environments, including but not limited to, cloud computing environments which are therefore improvements to computer technology. In contrast to embodiments of the present invention, presently, services provided by shared computing environments are constrained by the resource limitations of the environment itself and investing in permanently expanding capacity is not only expensive, it may result in many resources remaining idle for the majority of the time just so that there are sufficient resources at rare, busier times. Additionally, service providers cannot leverage the resources of their infrastructures that are not in use and idle resources are inefficient. By enabling non-permanent resource expansion for allocation of high quality composite services, embodiments of the present invention improve existing computer technology by enabling greater efficiency in resource utilization and also improve resource allocation itself by providing a higher quality service to a user of a shared computing environment.

Figure 1:
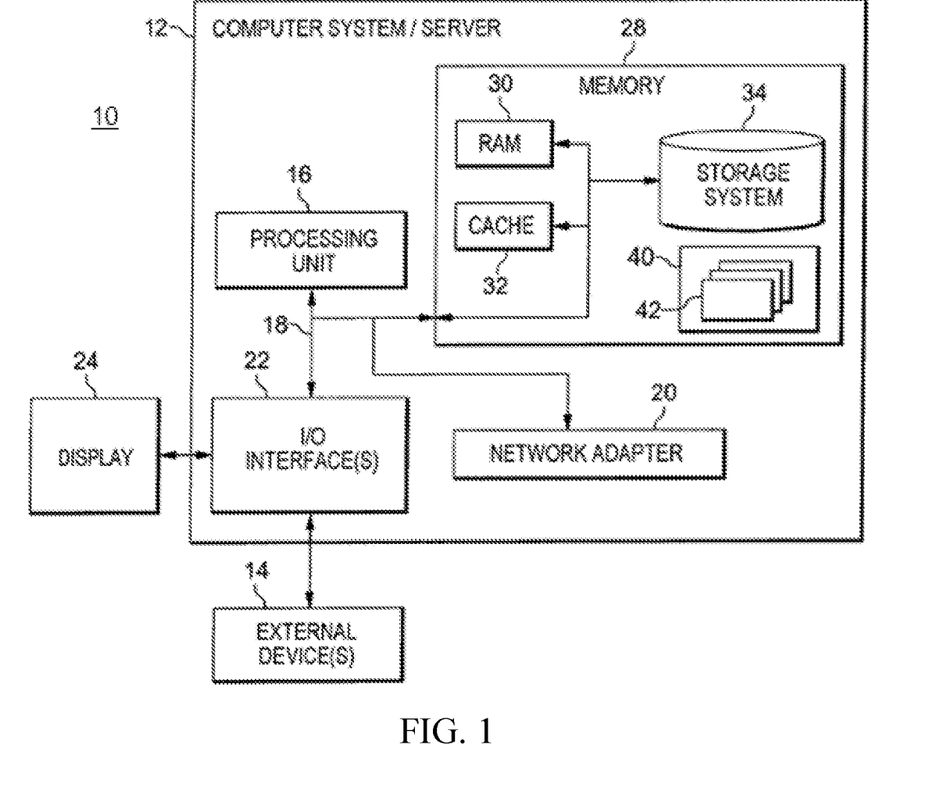
FIG. 1 depicts a cloud computing node, in accordance with one or more aspects set forth herein.
Figure 2:
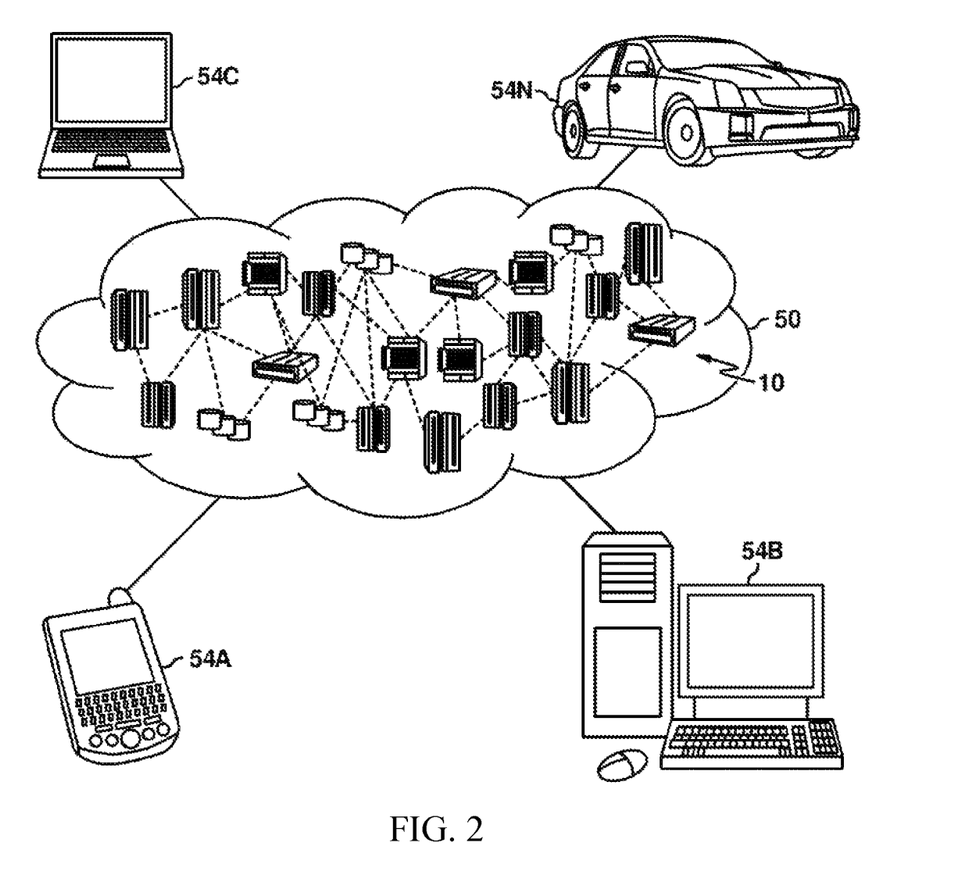
FIG. 2 depicts a cloud computing environment, in accordance with one or more aspects set forth herein.
Figure 3:
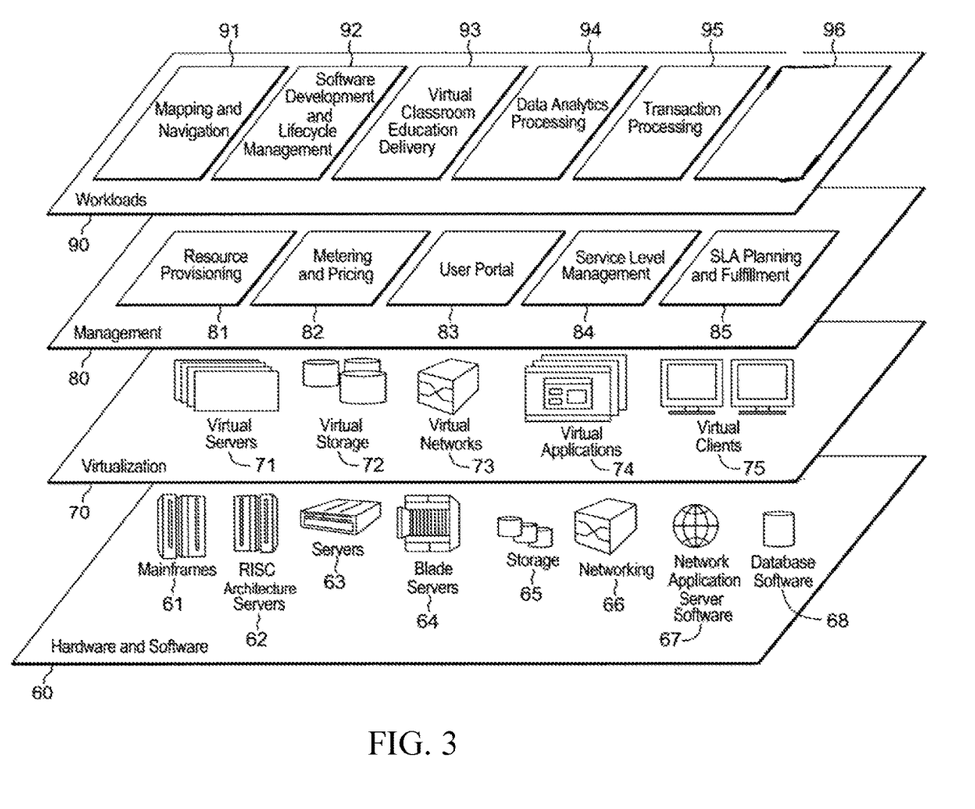
FIG. 3 depicts abstraction model layers, in accordance with one or more aspects set forth herein.

FIGS. 1-3 depict various aspects of computing, including cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown and/or a hardware overview of a computing node 10, in accordance with one or more aspects set forth herein. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, mobile devices, personal data assistants, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in cloud computing node 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Program/utility 40 as set forth in FIG. 1 can include one or more program 440, and program/utility 40, including, for example one or more program 440 to identify cloud resources for allocation to a given requestor for a given function, as described in work layer 96. Program/utility 40 as set forth in FIG. 1 can optionally include additional programs.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and identifying cloud resources for allocation to a given requestor for a given function 96, as described herein. Element 96 can be understood as one or more program 440 described in FIG. 1.

Referring again to FIG. 1:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As aforementioned, a technical challenge in a cloud computing system is the physical limitations of its hardware and software. Although the processing resources utilized by guests in this shared computing environment are not readily visible to the guests, under the layers of virtualization that allocate the resources to guests is a physical infrastructure with processing limitations. Thus, although the resources of a cloud are potentially vaster than that of a traditional private processing environment, the resources of the cloud, just like those of the private processing environment, are finite.

Embodiments of the present invention take advantage of the lack of transparency of the cloud resources to a guest by allocating to the guest, for completion of a given processing task, not only resources that are part of a given physical cloud environment, but resources that may technically be a part of additional (virtual and/or physical) computing environments, including but not limited to, resources of additional private and public clouds. Thus, embodiments of the present invention can leverage computing resources outside of a specific shared and possibly distributed computing environment to meet the needs of guests. Embodiments of the present invention include one or more programs 440 that expand the computing resources available to a guest in a given cloud computing environment without changing the user experience. In another embodiment of the present invention, one or more programs 440 (e.g., FIG. 1) effectively assemble a custom computing environment for a given guest, based upon the computing needs of that guest. In this aspect, the computing environment that the one or more programs 440 allocate to the guest may be a combination of resources from various shared or private computing environments. However, as with a guest utilizing resources of a cloud, the actual resources in the allocated computing environment are not transparent to the guest.

In an embodiment of the present invention, one or more programs 440 receive requests from guests that require the one or more programs 440 to allocate computing resources to these guests, and in response, the one or more programs 440 act as a broker for one or more resource providers, including one or more computing environments, and provide the guests with a resource allocation that may combine the resources of one or more individual computing systems. The resource allocation may include different types of resources from various systems or it may combine similar resources from the various systems in order to meet the requirements of the guest. Thus, in an aspect of this embodiment, one or more programs 440 receive a request for resources from a guest and the one or more programs 440 build a composite service to meet the computing needs of the guest by selecting and combining the resources and services (which can also be understood as a composite system) of one or more providers. For example, one or more programs 440 may receive a request from a guest for a secured managed web server, to meet all the requirements of this request, the one or more programs 440 may build a composite virtual environment for the guest that includes a virtual server from one provider and access security software as a service (SaaS), from a different provider. When utilizing the secured managed web server, the origins of the services that comprise the secured managed web server would not be apparent to the guest. In an embodiment of the present invention, the composite service is a complex service that the one or more programs 440 dynamically create from disparate static cloud providers.

After initially allocating a composite service to the guest, the one or more programs 440 can dynamically reconfirm that the resources that comprise the composite service are appropriate for the guest and can make changes to the resources of the service of the resource composition of the composite service is no longer appropriate. In an embodiment of the present invention, in addition to configuring a composite service for a guest, the one or more programs 440 monitor the composite service to verify that the assembled service is continuing to meet the computing demands of the guest. For example, while monitoring the service, one or more programs 440 may obtain an indication or observe an event indicating that a resource in the service should be replaced with another resources. For example, the one or more programs 440 may receive an indication that the resource is unresponsive and/or that the utilization of the composite service by the guest is exceeding the capacity of the resource. Based on this indication, the one or more programs 440 may replace a resource in the service with another resource that may or may not be from the provider of the initial resource. Thus, by monitoring the composite service, including the performance and capacity, the one or more programs 440 can make a change to the resources that comprise the composite service if the composite service starts to underperform, or if the one or more programs 440 determine that the workload of the guest can be performed without expending the level of resources allocated in the composite service. Because the guests that accesses the composite service is not aware of the resources that comprise the composite service, the changes that the one or more programs 440 implement are invisible to the guest.

In an embodiment of the present invention, in order to create a composite service for a guest, the one or more programs 440 select from available resources of various providers or may query providers for particular resources designated in a request from a guest. In an aspect of the certain embodiments of the present invention, the one or more programs 440 obtain data from providers indicating the resources that these providers can make available for utilization in the composite system. For example, a provider may communicate to the one or more programs 440 that it has unused processing cycles available on resources for a given timeframe (e.g., a provider may have ten machines running a particular operating system available for a given three week period). The one or more programs 440 may obtain this availability information in advance of receiving a guest request or in response to querying providers based on receiving a guest request. The one or more programs 440 may select a resource that is only temporarily available for a composite service provided that the processing requirements of the guest are met, and may assign a replacement resource at the expiration of the given timeframe.

The one or more programs 440 may obtain information that certain resources are available for allocation in composite services from a variety of sources. For example, resources in public clouds and private clouds may have been pre-registered as available. Alternatively, for a provider that is not pre-registered to indicate to the one or more programs 440 brokering the composite services that the provider has capacity available for allocation to guests, the provider may utilize a graphical user interface to communicate the parameters of the available capacity to the one or more programs 440. The one or more programs 440 may also auto-discover the availability of resources in certain public clouds based on the exposure of these resources to public querying.

In order for the one or more programs 440 to act as a broker and include a given resource in a composite service, one or more programs 440 of an infrastructure, unaffiliated with any cloud environment, registers the infrastructure with the so-called broker. The term infrastructure includes one or more of a full complement of computing resources, including but not limited to memory, storage, processors, and/or I/O capability, although in some. For example, infrastructure may register itself with one or more programs 440 in a cloud environment for virtual incorporation into that cloud. Once registered, one or more programs 440 allocating host resources from a cloud to a guest may allocate the infrastructure seamlessly to a guest system in the cloud computing environment just as it allocates any resource of the cloud. One or more programs 440 of the unaffiliated infrastructure leverage sharing economy attributes to make the infrastructure available for broader service, should ambient conditions permit. By registering base services, including but not limited to Infrastructure as a Service, with the one or more programs 440 that broker the base services, the unaffiliated resources and the cloud resources can offer more effective and efficient computing solutions by leveraging the now-expanded pool of resources to form a more complex services with each other, and by combining with further service providers. The one or more program 440 associated with unaffiliated resources may indicate that the resources are only temporarily available to provide services, for example, by flipping an indicator in a register or otherwise notifying the broker program(s), or by being automatically available post-registration with the broker, provided that the infrastructure is not being utilized by resources of the unaffiliated system or is not expected to be utilized by resources of the unaffiliated, at a given time.

In an embodiment of the present invention, one or more programs 440 may automatically build a composite service for a guest or may provide a guest with an interface where the one or more programs 440 indicate the availability of resources for the composite service and enable the guest to manually select from the available resources to build the composite service. In an embodiment of the present invention, a guest may make a request for a given resource and the one or more programs 440 respond to this request by breaking the request into technical components that will comprise the given resource when assembled. For example, a user utilizing a guest system may submit a request (e.g., through a graphical user interface) for a secure database. The one or more programs 440 separate this request into requests for a resource that will provide a technical infrastructure for the database and a security management application. The one or more programs 440 map these components to available providers and display these providers mapped to the components in a graphical user interface (GUI) rendered on a display of a computing node 10 (e.g., FIG. 1) accessed by the user. The one or more programs 440 may automatically map the components to the providers or the one or more programs 440 may enable the user to select mappings from available resources through the GUI.

In an embodiment of the present invention, the services and resources available to the one or more programs 440 for configuration of the composite service are user-dependent. In an embodiment of the present invention, the user may indicate to the one or more programs 440 the providers from which the one or more programs 440 can assemble resources for a composite service. For example, a user may access a GUI on a computer node 10 (e.g., FIG. 1) and register the systems in which it may access resources. For example, a user may register the public clouds, add in the private cloud providers based on whether the user has an account with the providers, and add any additional services to which the user subscribes. In an embodiment of the present invention, the one or more programs 440 may populate the available services for the user based on identifying information provided by the user to the one or more programs.

In an embodiment of the present invention, the one or more programs 440 assemble and offer a composite service to a user based on selections made by the user though a GUI. The one or more programs 440 may configure a display in a (e.g., web-based) GUI to present a user with various components (e.g., services) from which the users may select. After the user has selected the components in the GUI, the user may connect the selected components, for example, using standard mouse actions such as pointing and clicking and dragging lines between components. From the selections and connections made by the user in the GUI, the one or more programs 440 obtain the selections made by the user, as well as the proposed connectivity which indicates the network paths (e.g., firewalls, etc.) the one or more programs 440 must open between the selected components to allow them to work in a cohesive composite service. In order to configure the composite service, in this embodiment of the present invention, the one or more programs 440 execute commands to start instances of the components and to configure the connections. For example, the one of more programs 440 may execute commands using registered Application Programming Interfaces to create the instances, install the components (e.g., individual services), configure the service connections, and/or configure networks paths, etc., until the composite service defined by the user is constructed. Based on completing construction of the composite service, the one or more programs 440 provide the user with service entry and exit points. Accessing these points enable the user to utilize the composite service.

Figure 4:
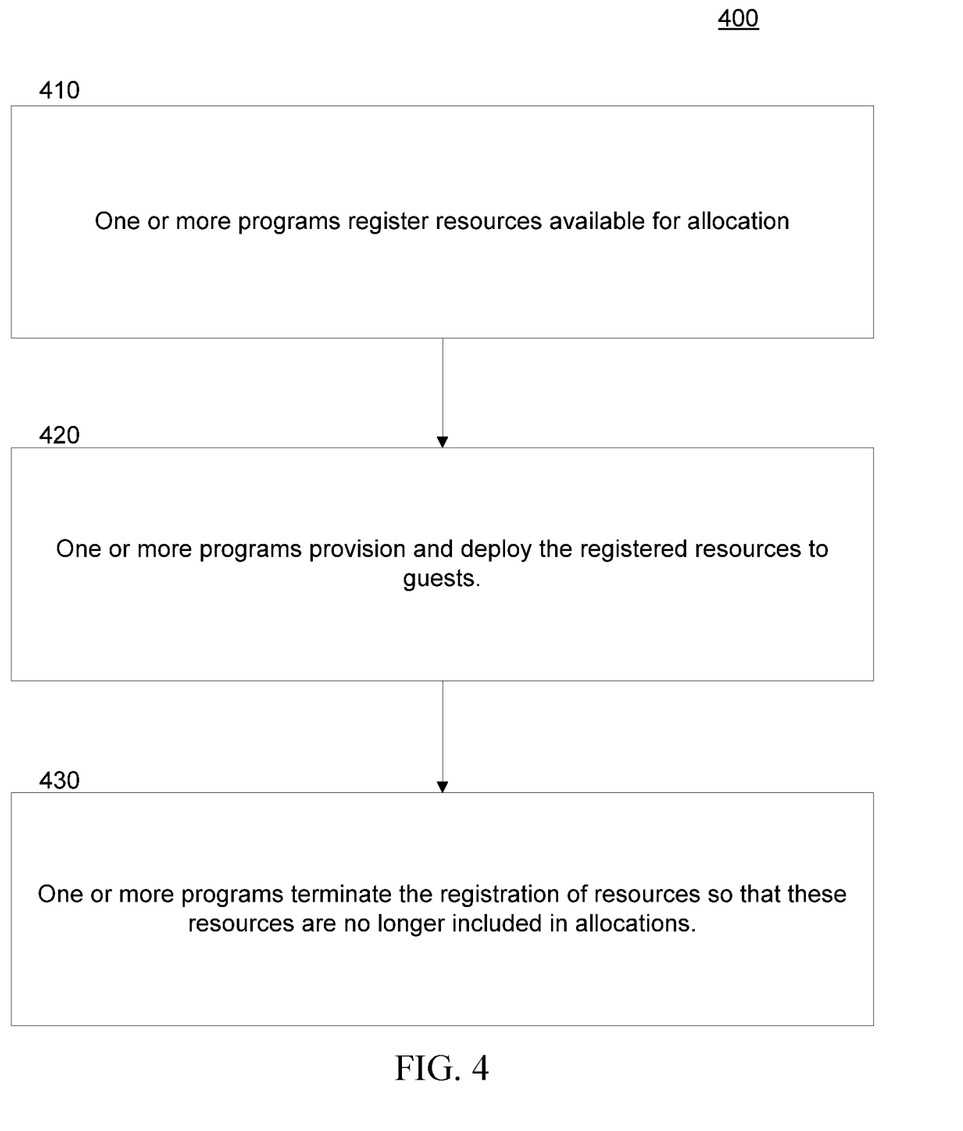
FIG. 4 depicts a workflow that illustrates aspects of an embodiment of the present invention.

FIG. 4 is a block diagram depicting 400 functionality that is comprised in aspects of certain embodiments of the present invention. This modular depiction of functionality is included merely for illustrative purposes and not as a limiting distribution of the functionality. Embodiments of the present invention include: 1) one or more programs 440 (e.g., FIG. 1) that register resources (e.g., including infrastructure) available for allocation (410), 2) one or more programs 440 that provision and deploy the registered resources to guests (420); and 3) one or more programs 440 that terminate the registration of resources so that these resources are no longer included in allocations (430).

Figure 5:
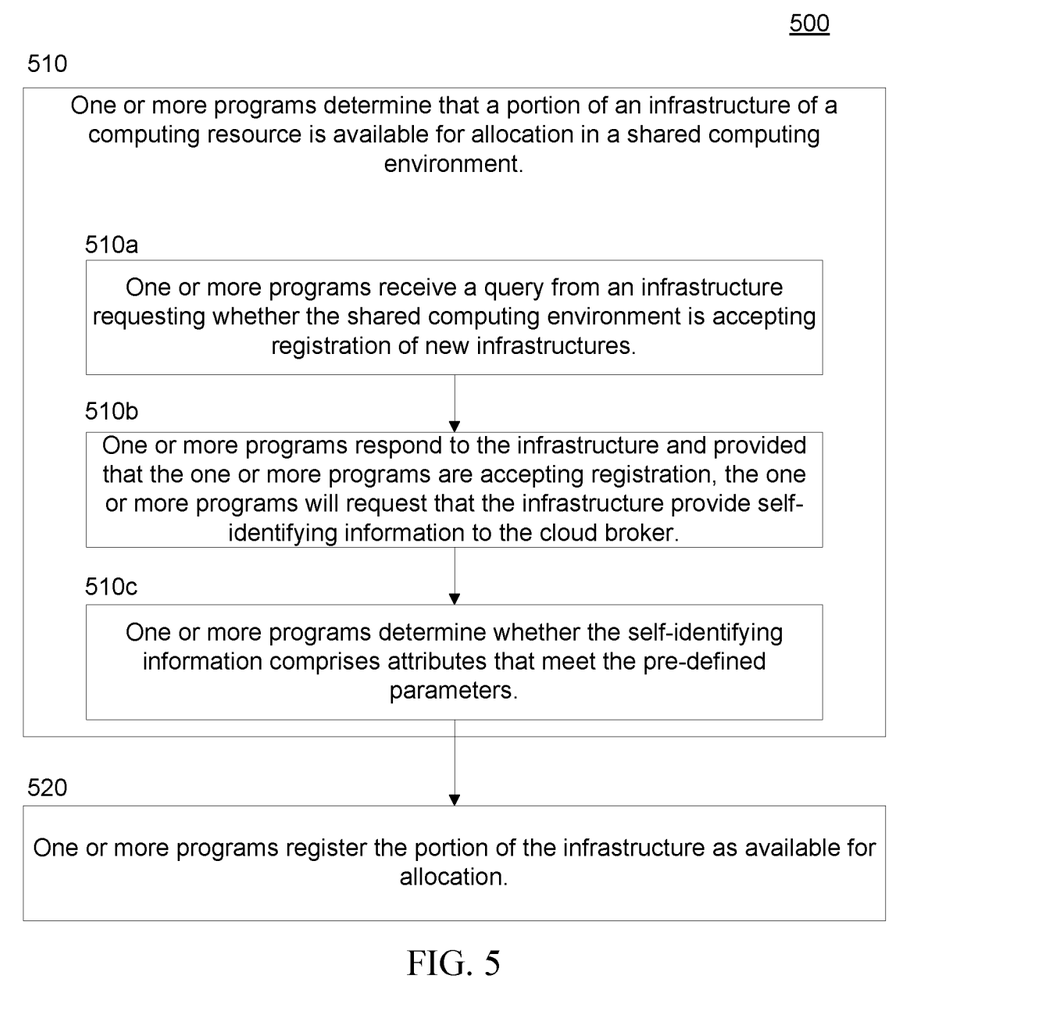
FIG. 5 depicts a workflow that illustrates aspects of the embodiment illustrated by FIG. 4.

FIG. 5 is a workflow 500 depicting an embodiment of the resource registration (410) aspect of FIG. 4. During resource registration, computing resources that are not part of a given shared computing environment, including but not limited to a cloud, become available for allocation by one or more programs 440 in the shared computing environment, either actively or passively. In an embodiment of the present invention, one or more programs 440 determine that a portion of an infrastructure of a computing resource is available for allocation in a shared computing environment (510). Based on making this determination, the one or more programs 440 register the portion of the infrastructure as available for allocation (520). Depending upon the embodiment of the present invention, the one or more programs 440 may determine that the portion of the infrastructure is available based on either a manual or an automated process. As discussed above, a user may utilize a GUI to indicate that a portion of an infrastructure is available and/or the one or more programs 440 may query known infrastructures to determine whether they are available. In an embodiment of the present invention, the one or more programs 440 determine that the portion of the infrastructure is available based on determining that the portion is available for a given period of time.

Provided that the period of time in which the portion of the resource is required is consistent with the availability of the resource, in an embodiment of the present invention, the one or more programs 440 can deploy the resource during its period of availability and dynamically swap this resource for an alternative if the period of utilization of the resource by the guests exceeds the period of the availability of the resource.

Returning, to FIG. 5, as part of the determination, in an embodiment of the present invention, the one or more programs 440 receive a query from an infrastructure requesting whether the shared computing environment is accepting registration of new infrastructures (510a). This inquiry may be made to one or more programs 440 that can be considered brokers of the services of the shared computing environment. This broker may be a direct agent of a commercial public or private cloud provider or it could be an intermediary which will in turn place the infrastructure with the cloud provider. Upon receiving the inquiry, the one or more programs 440 respond to the infrastructure and provided that the one or more programs 440 are accepting registration, the one or more programs 440 will request that the infrastructure provide self-identifying information to the cloud broker (510b). In an embodiment of the present invention, rather than requesting this information, the one or more programs 440 will obtain this information automatically. Based on pre-defined parameters, the one or more programs 440 determine whether the self-identifying information comprises attributes that meet the pre-defined parameters (510c).

In an embodiment of the present invention, one or more programs 440 gather the self-identifying information from resource providers, including but not limited to, static cloud providers. The one or more programs 440 use this information is used to create the complex services requested by guests and end users. The information may include, but is not limited to: Resource Type (e.g., Intel/AIX), Resource Availability, Cost, Service Level Agreements (SLAs), Security compliance, Service types (e.g., IaaS, SaaS, etc), and/or Methods of interaction (e.g., APIs, calls, etc.). In an embodiment of the present invention, the pre-defined parameters may comprise limitations related to the self-identifying information. For example, pre-defined parameters can be utilized to limit resource types, service types, and also, certain security requirements may comprise the parameters so resources brokered in accordance with an embodiment of the present invention meet certain security requirements.

Provided that the parameters are met, as noted above, the one or more programs 440 register the portion of the infrastructure (520). In an embodiment of the present invention, upon registration of the portion of the infrastructure, the one or more programs 440 may notify the infrastructure if the infrastructure comprises attributes meeting the pre-defined parameters for inclusion in the resources of the computing system. In other embodiments, the one or more programs 440 will notify the infrastructure when a job is planned for deployment. The latter situation may be utilized in instances where processing capabilities are substandard, security compliance is insufficient, etc., and so forth, rendering the infrastructure not ideal for allocation by the shared computing system (e.g., the cloud provider).

Figure 6:
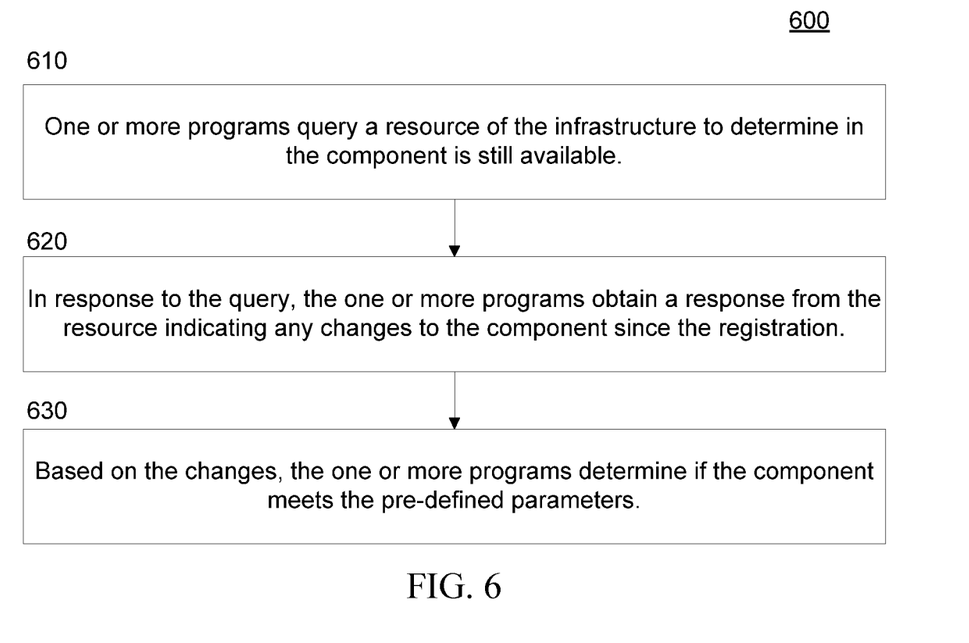
FIG. 6 depicts a workflow that illustrates aspects of the embodiment illustrated by FIG. 4.

FIG. 6 is a workflow 600 depicting an embodiment of the provisioning and deployment (420) aspect of FIG. 4. Provisioning and deployment described a process by which the one or more programs 440 put the registered infrastructure into place as a part of the shared computing environment. In an embodiment of the present invention, the one or more programs 440 may provision and deploy a component of the registered portion of the infrastructure upon receipt of a processing request that is met by allocation of a portion of this component. However, certain embodiments of the present invention include additional checks before provisioning and deployment of the components of the registered portion of the infrastructure and FIG. 6 illustrates a workflow 600 with these additional measures.

As illustrated in FIG. 6, in an embodiment of the present invention, before provisioning a component of the registered portion of the infrastructure, the one or more programs 440 query a resource of the infrastructure to determine if the component is still available (610). In response to the query, the one or more programs 440 obtain a response from the resource indicating any changes to the component since the registration (620). Based on the changes, the one or more programs 440 determine if the component meets the pre-defined parameters (630). Based on determining that the portion of the infrastructure meets the pre-defined parameters, the one or more programs 440 provision and deploy the component (e.g., responsive to the request from a user). As understood by one of skill in the art, the one or more programs 440 deploy additional resources outside the shared computing system, such as the portion of the infrastructure, utilizing the same methods as the one or more programs 440 utilize to deploy the resources within the shared computing environment.

Embodiments of the present invention may factor the locality of the components provisioned for deployment as part of a complex service into the provisioning and deployment decisions. In many cloud services, data locality is important for performance. For example, if a complex service includes a database from a service provider physically located in Europe and an application server from a provider physically located in Seattle, a user of the complex service that combines use of these resources would likely experience poor performance just based on latency when accessing data. To address this issue, in certain embodiments of the present invention, when the one or more programs 440 provision and deploy components, the one or more programs 440 would consider a user preference, which could be indicated in the initial user request, for service components that are local to each other. In an embodiment of the present invention, the one or more programs 440 may first attempt to provision a complex service taking into account the locality of the requestor, but in the absence of available resources that meet the parameters requested, the one or more programs 440 may provisions deploy a complex service that does not meet this locality preference.

Figure 7:
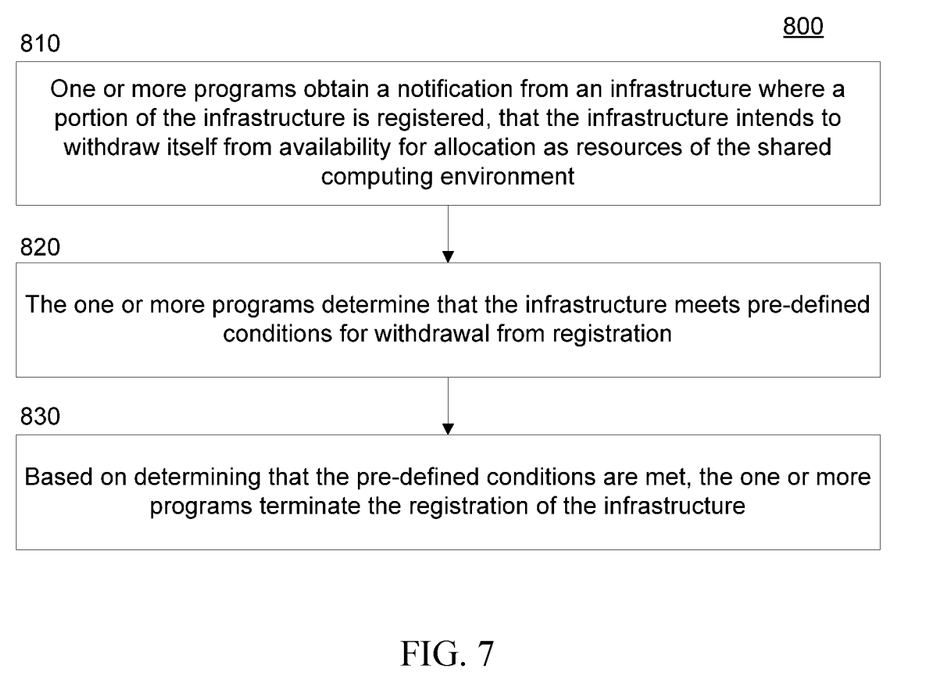
FIG. 7 depicts a workflow that illustrates aspects of the embodiment illustrated by FIG. 4.

FIG. 7 is a workflow 800 depicting an embodiment of the registration termination (430) aspect of FIG. 4. An infrastructure participating in resource sharing through the described broker program may terminate, either temporarily or permanently, its relationship with the shared computing environment (e.g., a cloud service provider). In an embodiment of the present invention, the one or more programs 440 obtain a notification from an infrastructure where a portion of the infrastructure is registered, that the infrastructure intends to withdraw itself from availability for allocation as resources of the shared computing environment (810). In an embodiment of the present invention, the infrastructure may provide this notification at any time, however, the notification may also be the result of the one or more programs 440 determining that the period in which the infrastructure indicated that the registered portion was available has expired.

In an embodiment of the present invention, the one or more programs 440 determine that the infrastructure meets pre-defined conditions for withdrawal from registration (820). The conditions for withdrawal may vary across different embodiments of the present invention. For example, in an embodiment of the present invention, the one or more programs 440 may require that a deployed portion of the infrastructure complete certain jobs or milestones before termination. In another embodiment of the present invention, the one or more programs 440 check whether SLAs have been met before the infrastructure can withdraw. In another embodiment, the one or more programs 440 provide for payment of services rendered before enabling withdrawal.

Returning to FIG. 7, based on determining that the pre-defined conditions are met, the one or more programs 440 terminate the registration of the infrastructure (830). In an embodiment of the present invention where the shared computing environment is a cloud, when the one or more programs 440 terminate the registration of an infrastructure, the one or more programs 440, i.e., the cloud broker, updates its resource tables accordingly.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
   obtaining, by one or more processor in a computing environment of a first service provider, an indication from a second service provider, wherein the indication alerts the first service provider that a portion of the infrastructure of the second service provider has available computing capacity during a predefined period of time, and wherein the portion of the infrastructure of the second service provider comprises at least one component in the infrastructure of the second service provider that is equivalent to at least one component in the infrastructure of the first service provider, wherein the at least one component in the infrastructure of the first service provider is deployed by the first service provider to subscribers to the first service provider to a service deployed from the first service provider;
   determining, by the one or more processor, based on attributes of the infrastructure of the second service provider and pre-defined parameters of the first service provider, that the first service provider can deploy the portion of the infrastructure of the second service provider, as a portion of the service deployed from the first service provider to the subscribers to the first service provider;
   based on determining that the first service provider can deploy the portion of the infrastructure of the second service provider, registering, by the one or more processor, the portion of the infrastructure of the second service provider, wherein the registering renders the portion of the infrastructure of the second service provider available for deployment by the first service provider to the subscribers to the first service provider to the service deployed from the first service provider;
   provisioning, by the one or more processor, the at least one component in the infrastructure of the second service provider for deployment to the subscribers by the first service provider in the service, wherein the service comprises the at least one component of the first service provider;
   deploying, by the one or more processor, the service to at least one subscriber of the subscribers;
   determining, by the one or more processors, that utilization of the at least one component in the infrastructure of the second service provider by the at least one subscriber of the subscribers exceeds the predefined period of time;
   automatically swapping, by the one or more processors, the at least one component in the infrastructure of the second service provider for an alternative at least one component of the second service provider in the deployed service;
   unregistering, by the one or more processor, the portion of the infrastructure of the second service provider, after passage of the predefined period of time, the unregistering comprising:
      determining, by the one or more processor, based on pre-defined conditions that the portion that the infrastructure of the second service provider can be unregistered; and
      based on the determining, unregistering, by the one or more processor, the portion of the infrastructure of the second service provider.

2. The method of claim 1, wherein in the determining further comprises:
   requesting, responsive to obtaining the indication, by one or more processor, the attributes of the infrastructure of the second service provider; and
   responsive to the requesting, obtaining, by the one or more processor, the attributes of the infrastructure of the second service provider.

3. The method of claim 2, wherein the attributes are selected from the group consisting of: resource type, security compliance information, processing capabilities, service type, cost, and method of interaction.

4. The method of claim 1, wherein the determining further comprises:

determining, by the one or more processor, that the portion of the infrastructure of the second service provider is available for deployment for a given period of time.

5. The method of claim 1, wherein in the provisioning comprises:
obtaining, by the one or more processor, a request from a user for the service, wherein the service comprises at least two components;
selecting, by one or more processor, the at least two components from a group of registered components, wherein at least one component selected comprises the at least one component of the second service provider; and
generating, by one or more processor, the service from the selected components.

6. The method of claim 5, wherein generating the service comprises one or more of: using registered Application Programming Interfaces to create instances of the at least two components, installing the at least two components, configuring connections between the at least two components, or configuring networks paths between the at least two components.

7. The method of claim 5,
wherein the deploying comprises providing, in an interface of a computing resource accessible to the user, a service entry point and a service exit point for utilizing the service.

8. The method of claim 7, further comprising:
monitoring, by the one or more processor, utilization of the service by the user, wherein the service comprises the at least two components;
obtaining, by the one or more processor, an indication from the user that the service is not meeting pre-defined parameters;
selecting, by the one or more processor, a component from a group of registered components; and
replacing, by the one or more processor, one of the at least two components with the component of the second service provider.

9. The method of claim 1, wherein the unregistering further comprises:
obtaining, by the one or more processor, an indication from the second service provider that the portion of the infrastructure of the second service provider is not available for provisioning and deployment by the first service provider.

10. The method of claim 9, wherein the predefined conditions are selected from the group consisting of: whether the service completed certain jobs, whether the portion of the infrastructure of the second service provider has met a Service Level Agreement, and whether payment has been made by the first service provider for utilization of the portion of the infrastructure of the second service provider.

11. The method of claim 1, wherein at least one of the first service provider or the second service provider is a cloud service provider.

12. A computer program product comprising:
a computer readable storage medium readable by one or more processor in a computing environment of a first service provider and storing instructions for execution by the one or more processor for performing a method comprising:
obtaining, by the one or more processor, an indication from a second service provider, wherein the indication alerts the first service provider that a portion of the infrastructure of the second service provider has available computing capacity during a predefined period of time, and wherein the portion of the infrastructure of the second service provider comprises at least one component in the infrastructure of the second service provider that is equivalent to at least one component in the infrastructure of the first service provider, wherein the at least one component in the infrastructure of the first service provider is deployed by the first service provider to subscribers to the first service provider to a service deployed from the first service provider;
determining, by the one or more processor, based on attributes of the infrastructure of the second service provider and pre-defined parameters of the first service provider, that the first service provider can deploy the portion of the infrastructure of the second service provider, as a portion of the service deployed from the first service provider to the subscribers to the first service provider;
based on determining that the first service provider can deploy the portion of the infrastructure of the second service provider, registering, by the one or more processor, the portion of the infrastructure of the second service provider, wherein the registering renders the portion of the infrastructure of the second service provider available for deployment by the first service provider to the subscribers to the first service provider to the service deployed from the first service provider;
provisioning, by the one or more processor, the at least one component in the infrastructure of the second service provider for deployment to the subscribers by the first service provider in the service, wherein the service comprises the at least one component in the infrastructure of the first service provider;
deploying, by the one or more processor, the service to at least one subscriber of the subscribers;
determining, by the one or more processors, that utilization of the at least one component in the infrastructure of the second service provider by the at least one subscriber of the subscribers exceeds the predefined period of time;
automatically swapping, by the one or more processors, the at least one component in the infrastructure of the second service provider for an alternative to the at least one component of the second service provider in the deployed service;
unregistering, by the one or more processor, the portion of the infrastructure of the second service provider, after passage of the predefined period of time, the unregistering comprising:
determining, by the one or more processor, based on pre-defined conditions that the portion that the infrastructure of the second service provider can be unregistered; and
based on the determining, unregistering, by the one or more processor, the portion of the infrastructure of the second service provider.

13. The computer program product of claim 12, where in the determining further comprises:
requesting, responsive to obtaining the indication, by one or more processor, the attributes of the infrastructure of the second service provider; and
responsive to the requesting, obtaining, by the one or more processor, the attributes of the infrastructure of the second service provider.

14. The computer program product of claim 12, wherein the determining further comprises:
  determining, by the one or more processor, that the portion of the infrastructure of the second service provider is available for deployment by the first service provider for a given period of time.

15. The computer program product of claim 12, wherein the provisioning comprises:
  obtaining, by the one or more processor, a request from a user for the service, wherein the service comprises at least two components;
  selecting, by one or more processor, the at least two components from a group of registered components, wherein at least one component selected comprises the at least one component of the second service provider; and
  generating, by one or more processor, the service from the selected components by configuring the at least two components and configuring connections between the at least two components.

16. The computer program product of claim 12,
  wherein the deploying comprises providing, in an interface of a computing resource accessible to the user, a service entry point and a service exit point for utilizing the service.

17. A system comprising:
  a memory;
  one or more processor in communication with the memory; and
  program instructions executable by the one or more processor in a computing environment of a first service provider via the memory to perform a method, the method comprising:
    obtaining, by the one or more processor, an indication from a second service provider, wherein the indication alerts the first service provider that a portion of the infrastructure of the second service provider has available computing capacity during a predefined period of time, and wherein the portion of the infrastructure of the second service provider comprises at least one component in the infrastructure of the second service provider that is equivalent to at least one component in the infrastructure of the first service provider, wherein the at least one component in the infrastructure of the first service provider is deployed by the first service provider to subscribers to the first service provider to a service deployed from the first service provider;
    determining, by the one or more processor, based on attributes of the infrastructure of the second service provider and pre-defined parameters of the first service provider, that the first service provider can deploy the portion of the infrastructure of the second service provider, as a portion of the service deployed from the first service provider to the subscribers to the first service provider;
    based on determining that the first service provider can deploy the portion of the infrastructure of the second service provider, registering, by the one or more processor, the portion of the infrastructure of the second service provider, wherein the registering renders the portion of the infrastructure of the second service provider available for deployment by the first service provider to the subscribers to the first service provider to the service deployed from the first service provider;
    provisioning, by the one or more processor, the at least one component in the infrastructure of the second service provider for deployment to the subscribers by the first service provider in the service, wherein the service comprises the at least one component in the infrastructure of the first service provider;
    deploying, by the one or more processor, the service to at least one subscriber of the subscribers;
    determining, by the one or more processors, that utilization of the at least one component in the infrastructure of the second service provider by the at least one subscriber of the subscribers exceeds the predefined period of time;
    automatically swapping, by the one or more processors, the at least one component in the infrastructure of the second service provider for an alternative to the at least one component of the second service provider in the deployed service;
    unregistering, by the one or more processor, the portion of the infrastructure of the second service provider, after passage of the predefined period of time, the unregistering comprising:
      determining, by the one or more processor, based on pre-defined conditions that the portion that the infrastructure of the second service provider can be unregistered; and
      based on the determining, unregistering, by the one or more processor, the portion of the infrastructure of the second service provider.

18. The system of claim 17, wherein the provisioning comprises:
  obtaining, by the one or more processor, a request from a user for the service, wherein the service comprises at least two components;
  selecting, by one or more processor, the at least two components from a group of registered components, wherein at least one component selected comprises the at least one component of the second service provider; and
  generating, by one or more processor, the service from the selected components by configuring the at least two components and configuring connections between the at least two components.

* * * * *